(12) United States Patent
Aiba et al.

(10) Patent No.: US 9,860,885 B2
(45) Date of Patent: Jan. 2, 2018

(54) TERMINAL DEVICE, BASE STATION DEVICE, COMMUNICATION METHOD, AND INTEGRATED CIRCUIT USING REFERENCE SIGNALS FOR DEMODULATION

(71) Applicant: SHARP KABUSHIKI KAISHA, Osaka-shi, Osaka (JP)

(72) Inventors: Tatsushi Aiba, Osaka (JP); Shoichi Suzuki, Osaka (JP); Kimihiko Imamura, Osaka (JP); Kazuyuki Shimezawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 24 days.

(21) Appl. No.: 14/382,741

(22) PCT Filed: Mar. 5, 2013

(86) PCT No.: PCT/JP2013/055919
§ 371 (c)(1),
(2) Date: Sep. 3, 2014

(87) PCT Pub. No.: WO2013/133248
PCT Pub. Date: Sep. 12, 2013

(65) Prior Publication Data
US 2015/0016385 A1 Jan. 15, 2015

(30) Foreign Application Priority Data

Mar. 6, 2012 (JP) ................................. 2012-048878

(51) Int. Cl.
*H04W 72/04* (2009.01)
*H04L 5/00* (2006.01)
(52) U.S. Cl.
CPC ......... *H04W 72/042* (2013.01); *H04L 5/0048* (2013.01); *H04L 5/0053* (2013.01)

(58) Field of Classification Search
CPC ... H04L 5/0048; H04L 5/0053; H04W 72/042
(Continued)

(56) References Cited

U.S. PATENT DOCUMENTS

2010/0215011 A1* 8/2010 Pan ...................... H04L 5/0064
370/329
2011/0064159 A1* 3/2011 Ko .......................... H04B 7/04
375/267

(Continued)

FOREIGN PATENT DOCUMENTS

JP 2012-34145 A 2/2012
WO WO 2012/094635 A1 7/2012

OTHER PUBLICATIONS

Pantech, "DL DM-RS Enhancements for Rel-11," 3GPP TSG RAN WG1 Meeting #68, R1-120320, Dresden, Germany, Feb. 6-10, 2012, pp. 1-5.*

(Continued)

*Primary Examiner* — Andrew Lai
*Assistant Examiner* — Mahmudul Hasan
(74) *Attorney, Agent, or Firm* — Birch, Stewart, Kolasch & Birch, LLP

(57) ABSTRACT

According to the present invention, there is provided a base station device, a terminal device, a communication method, an integrated circuit, and a radio communication system enabling a base station and a terminal device to decide a parameter related to a reference signal and efficiently communicate. A terminal device receives a reference signal associated with a physical downlink shared channel, the terminal device including means that receives the reference signal generated on the basis of a physical layer cell identity in a case in which a predetermined downlink control information format is used for scheduling of the physical downlink shared channel, and means that receives the reference signal generated on the basis of a parameter configured by (Continued)

a higher layer in a case in which a downlink control information format other than the predetermined downlink control information format is used for scheduling of the physical downlink shared channel.

18 Claims, 7 Drawing Sheets

(58) Field of Classification Search
USPC .................................. 370/329, 279; 455/507
See application file for complete search history.

(56) References Cited

U.S. PATENT DOCUMENTS

| | | | |
|---|---|---|---|
| 2011/0076962 A1* | 3/2011 | Chen | H04L 5/001 455/68 |
| 2011/0083066 A1* | 4/2011 | Chung | H03M 13/09 714/807 |
| 2011/0128893 A1* | 6/2011 | Park | H04B 7/155 370/279 |
| 2011/0134774 A1* | 6/2011 | Pelletier | H04W 52/365 370/252 |
| 2011/0194504 A1* | 8/2011 | Gorokhov | H04B 7/0417 370/329 |
| 2011/0243066 A1* | 10/2011 | Nayeb Nazar | H04L 1/007 370/328 |
| 2011/0269489 A1* | 11/2011 | Khoshnevis | H04L 25/0202 455/507 |
| 2011/0312316 A1* | 12/2011 | Baldemair | H04L 5/001 455/422.1 |
| 2012/0008556 A1* | 1/2012 | Noh | H04L 1/1893 370/328 |
| 2012/0033540 A1* | 2/2012 | Kim | H04B 7/0413 370/203 |
| 2012/0051319 A1* | 3/2012 | Kwon | H04W 72/0406 370/329 |
| 2012/0069802 A1* | 3/2012 | Chen | H04L 5/001 370/329 |
| 2012/0176884 A1* | 7/2012 | Zhang | H04B 7/024 370/203 |
| 2012/0176885 A1* | 7/2012 | Lee | H04J 13/0048 370/209 |
| 2012/0195271 A1* | 8/2012 | Lee | H04L 5/003 370/329 |
| 2012/0282936 A1* | 11/2012 | Gao | H04L 5/0023 455/450 |
| 2013/0003604 A1* | 1/2013 | Blankenship | H04L 5/0053 370/255 |
| 2013/0003663 A1* | 1/2013 | Blankenship | H04L 5/0053 370/329 |
| 2013/0039284 A1* | 2/2013 | Marinier | H04L 5/001 370/329 |
| 2013/0039387 A1* | 2/2013 | Qu | H04L 5/0051 375/141 |
| 2013/0083739 A1* | 4/2013 | Yamada | H04W 74/006 370/329 |
| 2015/0139079 A1* | 5/2015 | Zhu | H04N 21/2365 370/329 |
| 2015/0296513 A1* | 10/2015 | Nogami | H04W 28/18 370/329 |

OTHER PUBLICATIONS

ZTE. "Initialization for DMRS in CoMP," 3GPP TSG RAN WG1 Meeting #68, R1-120304, Dresden, Germany, Feb. 6-10, 2012, pp. 1-4.*
Alcatel-Lucent, Alcatel-Lucent Shanghai Bell, "Orthogonality of DM RS for MU-CoMP", 3GPP TSG RAN WG1 meeting #68 R1-120497, Feb. 6-10, 2012.*
R1-120320, Pantech, "DL DM-RS Enhancements for Rel-11," 3GPP TSG RAN WG1 Meeting #68, R1-120320, Dresden, Germany, Feb. 6-10, 2012, pp. 1-5.*
R1-120304, ZTE. "Initialization for DMRS in CoMP," 3GPP TSG RAN WG1 Meeting #68, R1-120304, Dresden, Germany, Feb. 6-10, 2012, pp. 1-4.*
R1-114074, NTT Docomo, Inc., "DL DM-RS Sequence for Rel-11 CoMP," 3GPP TSG RAN WG1 #67, R1-114074, San Francisco, USA, Nov. 14-18, 2011, (Downloaded by the EPO on Nov. 11, 2011, pp. 1-7, XP-50562432A.*
R1-120497, Alcatel-Lucent, Alcatel-Lucent Shanghai Bell, "Orthogonality of DM RS for MU-CoMP", 3GPP TSG RAN WG1 meeting #68 R1-120497, Feb. 6-10, 2012.*
LG Electronics, "Discussions on DMRS Configuration for CoMP," 3GPP TSG RAN WG1 Meeting #68, R1-120438, Dresden, Germany, Feb. 6-10, 2012, (Downloaded by the EPO on Jan. 31, 2012), pp. 1-3, XP-50562928A.
NTT Docomo, Inc., "DL DM-RS Sequence for Rel-11 CoMP," 3GPP TSG Ran WG1 #67, R1-114074, San Francisco, USA, Nov. 14-18, 2011, (Downloaded by the EPO on Nov. 11, 2011, pp. 1-7, XP-50562432A.
Samsung, "DMRS Scrambling for Downlink CoMP," 3GPP TSG RAN WG1 #67, R1-114226, San Francisco, USA, Nov. 14-18, 2011, 4 pages.
ZTE, "Initialization for DMRS in CoMP," 3GPP TSG RAN WG1 Meeting #68, R1-120304, Dresden, Germany, Feb. 6-10, 2012, pp. 1-4.
Alcatel-Lucent, Alcatel-Lucent Shanghai Bell, "Orthogonality of DM RS for MU-CoMP", 3GPP TSG RAN WG1 meeting #68 R1-120497, Feb. 6-10, 2012. (http://www.3gpp.org/ftp/tsg_ran/WG1-RL1/TSGR1_68/Docs/R1-120497.zip).
Hitachi, Ltd, "DL DMRS Enhancement for CoMP", 3GPP TSG-RAN WG1 Meeting #68, R1-120245, Dresden, Germany, Feb. 6-10, 2012 (Available online Jan. 31, 2012), pp. 1-4.
3GPP TS 36.211, '3rd Generation Partnership Project; Technical Specification Group Radio Access Network; E-UTRA; Physical Channels and Modulation (Release 10), V10.4,0, Dec. 2011, 101 pages.

* cited by examiner

TERMINAL DEVICE, BASE STATION DEVICE, COMMUNICATION METHOD, AND INTEGRATED CIRCUIT USING REFERENCE SIGNALS FOR DEMODULATION

TECHNICAL FIELD

The present invention relates to a terminal device, a base station device, a communication method, an integrated circuit, and a radio communication system.

BACKGROUND ART

In radio communication systems, such as Wideband Code Division Multiple Access (WCDMA), Long Term Evolution (LTE), and LTE-Advanced (LTE-A) by the Third Generation Partnership Project (3GPP), or wireless LAN and Worldwide Interoperability for Microwave Access (WiMAX) by the Institute of Electrical and Electronics Engineers (IEEE), a base station device (hereinafter also called a base station, cell, serving cell, transmitting station, transmitting device, or eNodeB) and a terminal (hereinafter also called mobile station device, mobile terminal, receiving station, mobile station, receiving device, or user equipment (UE)) are each equipped with one or multiple transmit/receive antennas, and by using multiple-input and multiple-output (MIMO) technology, for example, high-speed data transmission may be realized.

In such radio communication systems, in the case in which the base station transmits downlink data to the terminal (a transport block with respect to a downlink shared channel (DL-SCH)), a demodulation reference signal (DMRS), which is known signal between the base station and the terminal, is multiplexed and transmitted. Herein, the demodulation reference signal may also be called the user equipment-specific reference signal (UE-specific RS). Hereinafter, the demodulation reference signal will also be simply designated the reference signal.

For example, the reference signal is multiplexed with downlink data before a precoding process is applied. For this reason, by using the reference signal, the terminal is able to measure an equalized channel that included the applied precoding process as well as the channel state. In other words, the terminal is able to demodulate the downlink data without being notified of the precoding process by the base station.

At this point, the downlink data is mapped to a physical downlink shared channel (PDSCH). In other words, the reference signal is used for demodulation of the PDSCH. As another example, the reference signal is transmitted only in resource blocks (also called physical resource blocks or resources) into which the corresponding PDSCH has been mapped.

Currently, radio communication systems using a heterogeneous network deployment (HetNet) made up of a macro base station with wide coverage and remote radio heads (RRHs) with narrower coverage than the macro base station are being considered. FIG. 7 is a diagrammatic overview of a radio communication system using a heterogeneous network deployment. As illustrated in FIG. 7, a heterogeneous network is made up of a macro base station 701, an RRH 702, and an RRH 703, for example.

In FIG. 7, the macro base station 701 constructs a coverage 705, while the RRH 702 and the RRH 703 construct a coverage 706 and a coverage 707, respectively. Additionally, the macro base station 701 is connected to the RRH 702 through a link 708, and is connected to the RRH 703 through a link 709. Consequently, the macro base station 701 is able to transmit and receive data signals and control signals (control information) with the RRH 702 and the RRH 703. Herein, a wired link such as optical fiber or a wireless link using relay technology is used for the link 708 and the link 709, for example. In this case, by having some or all of the macro base station 701, the RRH 702, and the RRH 703 use the same resources, it is possible to improve the spectral efficiency (transmission capacity) within the area of the coverage 705.

Also, if a terminal 704 is positioned within the coverage 706, the terminal 704 is able to conduct single-cell communication with the RRH 702. Also, if the terminal 704 is positioned near the boundary (cell edge) of the coverage 706, countermeasures against same-channel interference from the macro base station 701 become necessary. Currently, for multi-cell communication (cooperative communication) between the macro base station 701 and the RRH 702, a method that reduces or suppresses interference with respect to the terminal 704 in a cell edge area by conducting base-to-base cooperative communication in which neighboring base stations cooperate with each other is being investigated. For example, schemes such as the cooperative multipoint (CoMP) transmission scheme are being investigated as a scheme to reduce or suppress interference with base-to-base cooperative communication (NPL 1).

CITATION LIST

Non-Patent Document

NPL 1: "Orthogonality of DMRS for MU-CoMP", 3GPP TSG RAN WG1 meeting #68 R1-120497, Feb. 6-10, 2012.

SUMMARY OF INVENTION

Disclosure of the Invention

Problems to be Solved by the Invention

However, there is no description of a specific procedure to conduct when a base station and a terminal transmit and receive a reference signal in a radio communication system. For example, there is no description of how a base station and a terminal decide a parameter related to the reference signal and communicate.

The present invention has been devised in light of the above problem, and an object thereof is to provide a terminal device, a base station device, a communication method, an integrated circuit, and a radio communication system enabling a base station and a terminal to decide a parameter related to a reference signal and efficiently communicate.

Means for Solving the Problems (1) In order to achieve the above object, the present invention adopts means like the following. Namely, a terminal device according to the present invention is a terminal device that receives from a base station device a reference signal associated with a physical downlink shared channel, and includes: means that receives from the base station device the reference signal generated on the basis of a physical layer cell identity in a case in which a predetermined downlink control information format is used for scheduling of the physical downlink shared channel; and means that receives from the base station device the reference signal generated on the basis of a parameter configured by a higher layer in a case in which a downlink control information format other than the predetermined downlink control information format is used for scheduling of the physical downlink shared channel.

(2) Also, a base station device according to the present invention is a base station device that transmits to a terminal device a reference signal associated with a physical downlink shared channel, and includes: means that transmits to the terminal device the reference signal generated on the basis of a physical layer cell identity in a case of using a predetermined downlink control information format for scheduling of the physical downlink shared channel; and means that transmits to the terminal device the reference signal generated on the basis of a parameter of a higher layer in a case of using a downlink control information format other than the predetermined downlink control information format for scheduling of the physical downlink shared channel.

(3) Also, a communication method according to the present invention is a communication method of a terminal device that receives from a base station device a reference signal associated with a physical downlink shared channel. The communication method includes: receiving from the base station device the reference signal generated on the basis of a physical layer cell identity in a case in which a predetermined downlink control information format is used for scheduling of the physical downlink shared channel; and receiving from the base station device the reference signal generated on the basis of a parameter configured by a higher layer in a case in which a downlink control information format other than the predetermined downlink control information format is used for scheduling of the physical downlink shared channel.

(4) Also, a communication method according to the present invention is a communication method of a base station device that transmits to a terminal device a reference signal associated with a physical downlink shared channel. The communication method includes: transmitting to the terminal device the reference signal generated on the basis of a physical layer cell identity in a case of using a predetermined downlink control information format for scheduling of the physical downlink shared channel; and transmitting to the terminal device the reference signal generated on the basis of a parameter of a higher layer in a case of using a downlink control information format other than the predetermined downlink control information format for scheduling of the physical downlink shared channel.

(5) Also, an integrated circuit according to the present invention is an integrated circuit mounted in a terminal device that receives from a base station device a reference signal associated with a physical downlink shared channel. The integrated circuit causes the terminal device to exhibit: a function that receives from the base station device the reference signal generated on the basis of a physical layer cell identity in a case in which a predetermined downlink control information format is used for scheduling of the physical downlink shared channel; and a function that receives from the base station device the reference signal generated on the basis of a parameter configured by a higher layer in a case in which a downlink control information format other than the predetermined downlink control information format is used for scheduling of the physical downlink shared channel.

(6) Also, an integrated circuit according to the present invention is an integrated circuit mounted in a base station device that transmits to a terminal device a reference signal associated with a physical downlink shared channel. The integrated circuit causes the base station device to exhibit: a function that transmits to the terminal device the reference signal generated on the basis of a physical layer cell identity in a case of using a predetermined downlink control information format for scheduling of the physical downlink shared channel; and a function that transmits to the terminal device the reference signal generated on the basis of a parameter of a higher layer in a case of using a downlink control information format other than the predetermined downlink control information format for scheduling of the physical downlink shared channel.

Effects of the Invention

According to the present invention, a base station and a terminal are able to decide a parameter related to a reference signal and efficiently communicate.

BEST MODE FOR CARRYING OUT THE INVENTION

Hereinafter, an exemplary embodiment of the present invention will be described. A radio communication system in an embodiment of the present invention is equipped with base stations (also called a transmitting device, cell, serving cell, transmit point, transmit antenna group, transmit antenna port group, component carrier, or eNodeB), the base stations including a primary base station (also called a macro base station, first base station, first communication device, serving base station, anchor base station, first component carrier, or primary cell) and a secondary base station (also called an RRH, pico base station, femto base station, Home eNodeB, second base station device, cooperative base station group, cooperative base station set, second communication device, cooperative base station, second component carrier, or secondary cell). In addition, a terminal (also called a mobile station device, terminal device, mobile terminal, receiving point, receiving terminal, receiving device, third communication device, receive antenna group, receive antenna port group, or user equipment (UE)) is also provided.

Herein, the secondary base station may also be illustrated as multiple secondary base stations. For example, the primary base station and the secondary base station may use a heterogeneous network deployment, so that some or all of the coverage of the secondary base station is included in the coverage of the primary base station, and multi-cell communication or single-cell communication is conducted. The following will describe a case in which the primary base station and the secondary base station communicate using the same frequency resources as an example, but the present embodiment obviously may be applied to all similar embodiments.

Figure 1:
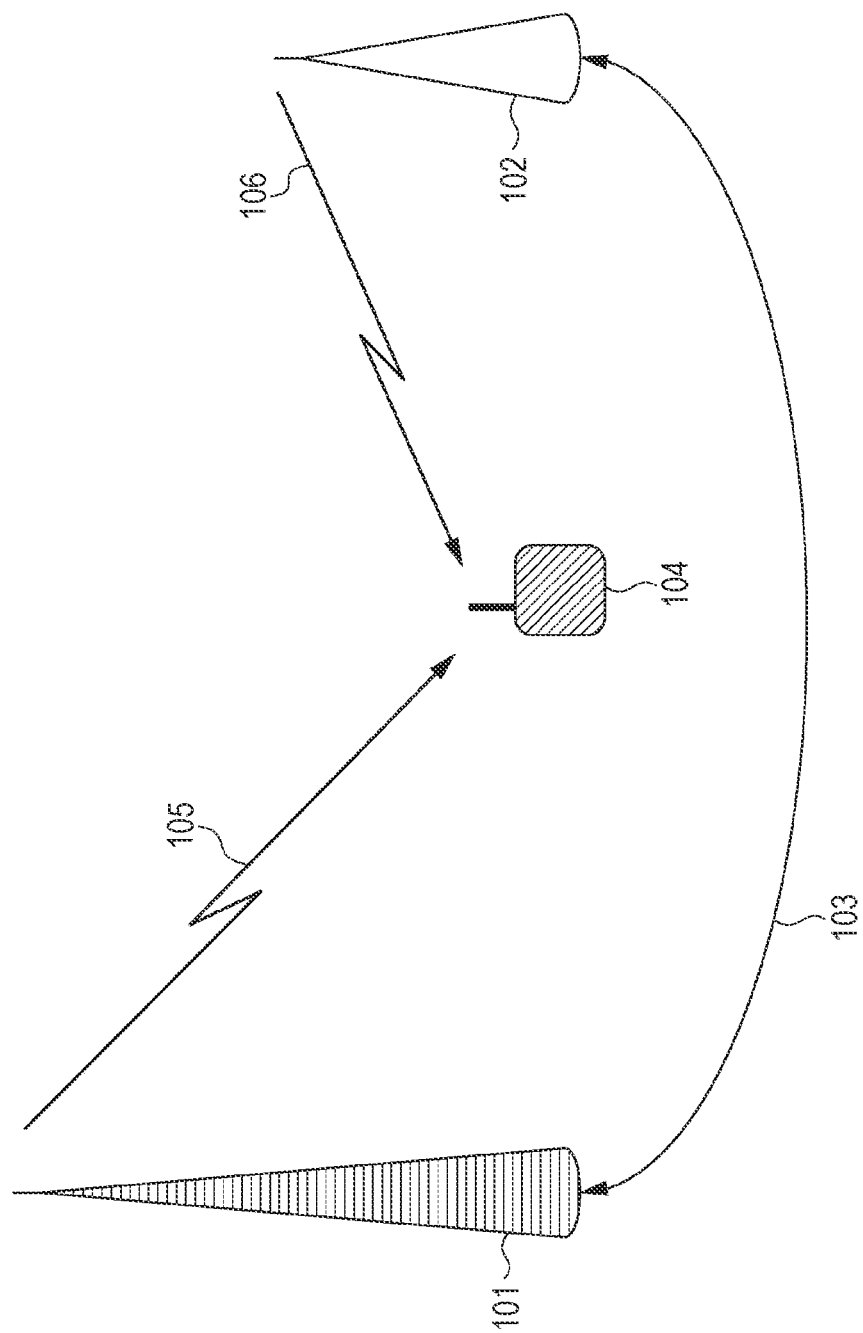
FIG. 1 is a schematic diagram illustrating an example of multi-cell communication in a radio communication system according to an embodiment of the present invention.

FIG. 1 is a schematic diagram illustrating an example of multi-cell communication in a radio communication system according to an embodiment of the present invention. In FIG. 1, a terminal 104 is positioned in a cell edge area (boundary area) of a secondary base station 102, and multi-cell communication is conducted with a primary base station 101 and the secondary base station 102.

Herein, multi-cell communication refers to multiple base stations cooperating with each other to transmit signals (such as data signals and control signals) to a terminal. For example, multi-cell communication encompasses CoMP transmission schemes. More specifically, multi-cell communication encompasses joint transmission (also called joint processing), in which the same signal is transmitted from multiple base stations. Also, multi-cell communication encompasses dynamic cell selection, in which the base station that transmits a signal is dynamically switched. Also, multi-cell communication encompasses coordinated beamforming, in which base stations coordinate with each other to conduct beamforming and reduce cross-interference. Also, multi-cell communication encompasses coordinated scheduling, in which base stations coordinate with each other to conduct scheduling and reduce cross-interference.

In FIG. 1, joint transmission is illustrated as an example of multi-cell communication. In FIG. 1, the terminal 104 receives a signal addressed to the terminal 104 via a downlink 105 between the primary base station 101 and the terminal 104 as well as via a downlink 106 between the secondary base station 102 and the terminal 104. Also, a reference signal is multiplexed into the signal addressed to the terminal 104. At this point, the reference signal transmitted by the primary base station 101 and the reference signal transmitted by the secondary base station 102 are preferably the same.

Figure 2:
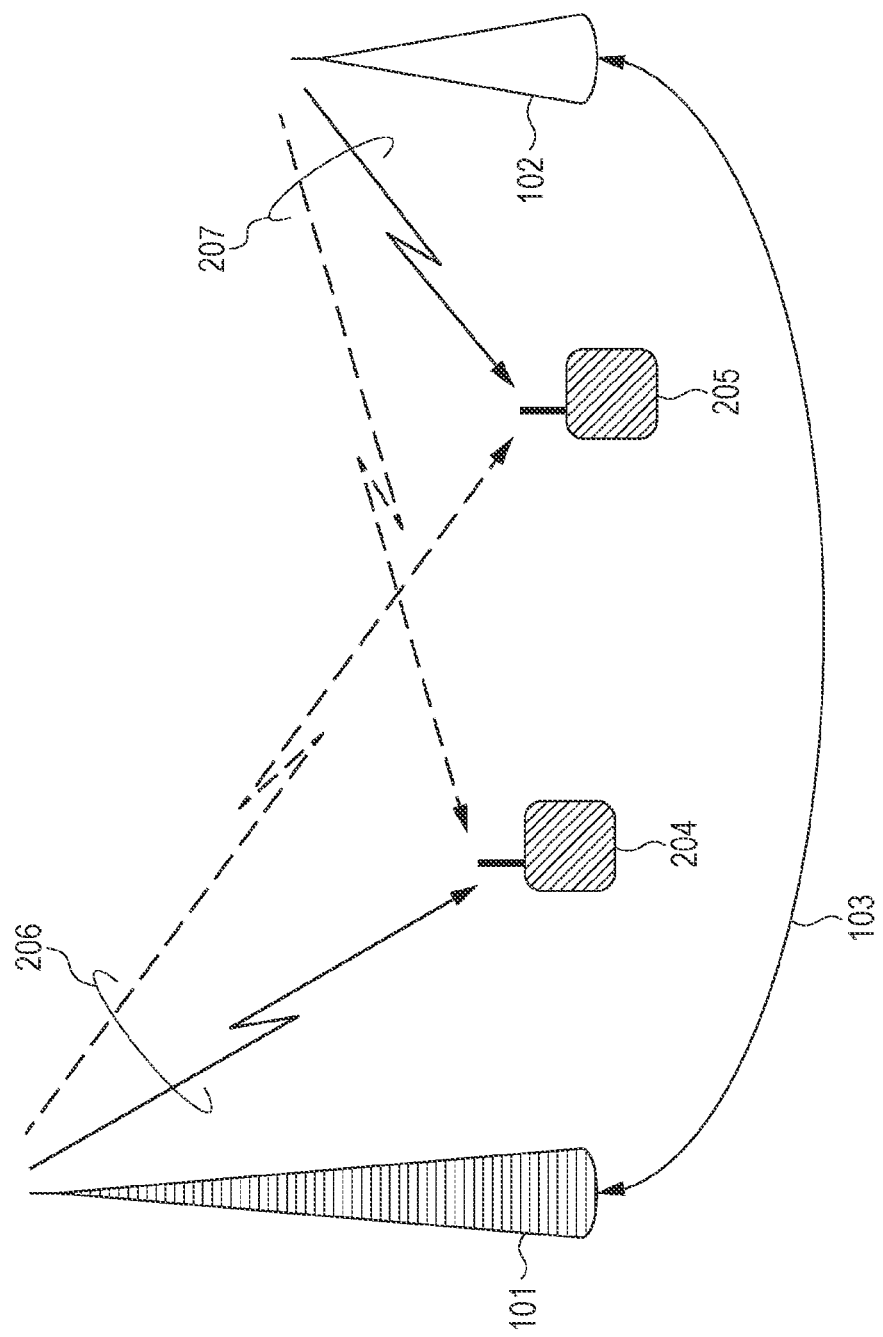
FIG. 2 is a schematic diagram illustrating an example of single-cell communication in a radio communication system according to an embodiment of the present invention.

FIG. 2 is a schematic diagram illustrating an example of single-cell communication in a radio communication system according to an embodiment of the present invention. In FIG. 2, a terminal 204 conducts single-cell communication with the primary base station 101, while a terminal 205 conducts single-cell communication with the secondary base station 102. Herein, the primary base station 101 multiplexes a reference signal into a signal addressed to the terminal 204, and transmits the multiplexed signal via a downlink 206. Also, the secondary base station 102 multiplexes a reference signal into a signal addressed to the terminal 205, and transmits the multiplexed signal via a downlink 207.

Herein, single-cell communication refers to a single base station transmitting signals (such as data signals and control signals) to a terminal. For example, single-cell communication encompasses schemes such as conventional transmission modes (communication methods) stipulated in a communication system that maintains backward compatibility.

FIG. 2, if a signal addressed to the terminal 204 and a signal addressed to the terminal 205 are transmitted using the same frequency-domain and time-domain resources, the signals interfere with each other on the same channel. In other words, the signal transmitted via the downlink 206 produces interference at the terminal 205, while the signal transmitted via the downlink 207 produces interference at the terminal 204. At this point, since the signal addressed to the terminal 204 and the signal addressed to the terminal 205 typically differ, the signals are lowly correlated with each other. For this reason, the terminal 204 and the terminal 205 may each treat the respectively interfering signals as white noise.

However, if the reference signal multiplexed into the signal addressed to the terminal 204 and the reference signal multiplexed into the signal addressed to the terminal 205 are the same, the signals will become highly correlated with each other. Consequently, in the terminal 204 and the terminal 205, the accuracy of estimating the channel state used in order to demodulate the respective signals is significantly degraded. For this reason, the reference signal transmitted by the primary base station 101 and the reference signal transmitted by the secondary base station 102 are preferably different.

At this point, in FIG. 1 and FIG. 2, it is possible to configure different cell identities (also called cell IDs) for the primary base station and the secondary base station (also called different cell ID). Furthermore, in a heterogeneous network deployment, it is also possible to configure the same cell identities for all or some of the primary base station and the secondary base station (also called shared cell ID or same cell ID).

Figure 3:
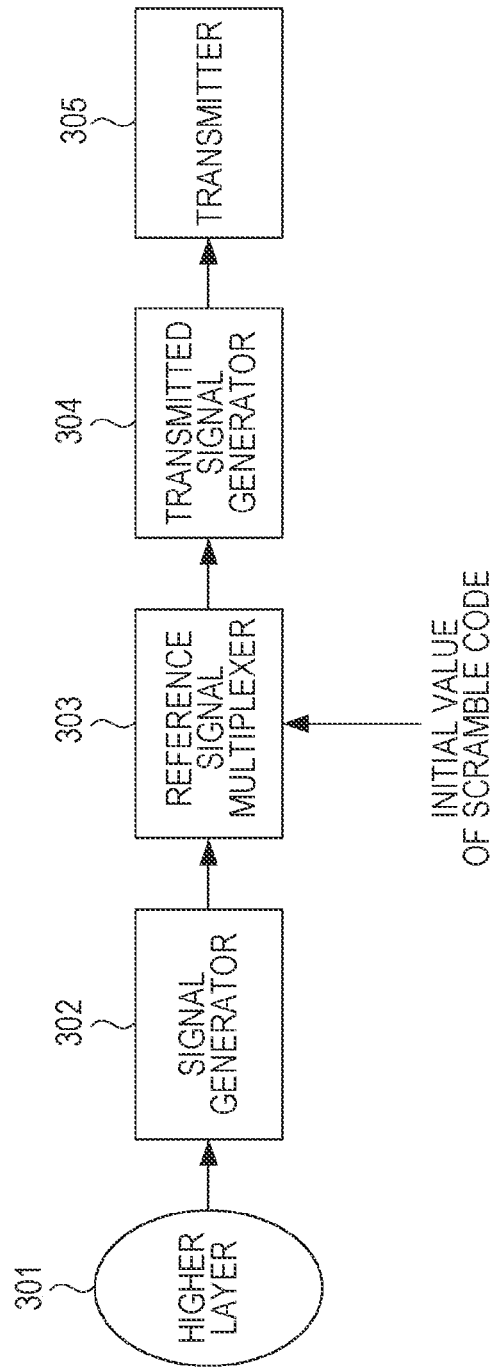
FIG. 3 is a schematic block diagram illustrating a configuration of a base station according to an embodiment of the present invention.

FIG. 3 is a schematic block diagram illustrating a configuration of a base station according to an embodiment of the present invention. Herein, the base station illustrated in FIG. 3 encompasses the primary base station 101 and the secondary base station 102. As illustrated in FIG. 3, the base station is equipped with a higher layer 301, a signal generator 302, a reference signal multiplexer 303, a transmitted signal generator 304, and a transmitter 305.

The higher layer 301 outputs information data for each terminal from a higher layer, such as the data link layer. At this point, various control information in a higher layer and the physical layer (including information such as adaptive control information, scheduling information, base station information, and terminal information) is shared within the base station. Furthermore, the various control information is shared between the primary base station 101 and the secondary base station 102 via the link 103 (this also encompasses sharing among multiple primary base stations and multiple secondary base stations).

The signal generator 302 processes input information data, such as by conducting a scramble process, a coding process, a modulation process, and a layer mapping process, and generates a signal (such as a data signal or a control signal). Note that the signal generator 302 conducts the scramble process, coding process, and modulation process in units of information data called codewords. For example, the base station is able to transmit a maximum of up to two codewords to each terminal.

The reference signal multiplexer 303 multiplexes a reference signal into a generated signal. At this point, the reference signal is multiplexed by code division multiplexing (CDM) and/or frequency division multiplexing (FDM), depending on the number of signal layers (also called the number of ranks or number of spatially multiplexed streams). Herein, as an example, a 2-chip or 4-chip Walsh sequence is used depending on the number of layers as the orthogonal coding for applying CDM to the reference signal.

In other words, for example, in a resource block allocated for the transmission of a corresponding PDSCH, a reference signal sequence is convoluted with a Walsh sequence, and mapped to modulation symbols. Herein, the reference signal sequence is defined (generated) on the basis of a pseudo-random sequence, for example. Also, the pseudo-random sequence is defined (generated) by a Gold sequence. Also, an initial value for initializing the pseudo-random sequence is given. In other words, an initial value for initializing the pseudo-random sequence is input into the reference signal multiplexer 303.

The transmitted signal generator 304 conducts a precoding process and the like in order to conduct phase shifting and beamforming on the signal and the reference signal. Herein, the precoding process preferably applies a phase shift or the like to the signal so that a terminal is able to receive efficiently (for example, so that the received power is maximized, so that interference from a neighboring cell is reduced, or so that interference on a neighboring cell is reduced). For example, the transmitted signal generator 304 conducts processes such as a process according to a predetermined precoding matrix, and transmission diversity such as cyclic delay diversity (CDD).

In addition, the transmitted signal generator 304 maps the downlink data and the reference signal to PDSCH resources on the basis of scheduling for the terminal, for example. Also, the transmitted signal generator 304 maps a downlink control signal (downlink control information) and the reference signal to physical downlink control channel (PDCCH) resources on the basis of scheduling for the terminal.

The transmitter 305, after applying an inverse fast Fourier transform (IFFT), adding a guard interval, and the like, transmits the signal and the reference signal using at least one transmit antenna (transmit antenna port).

Figure 4:
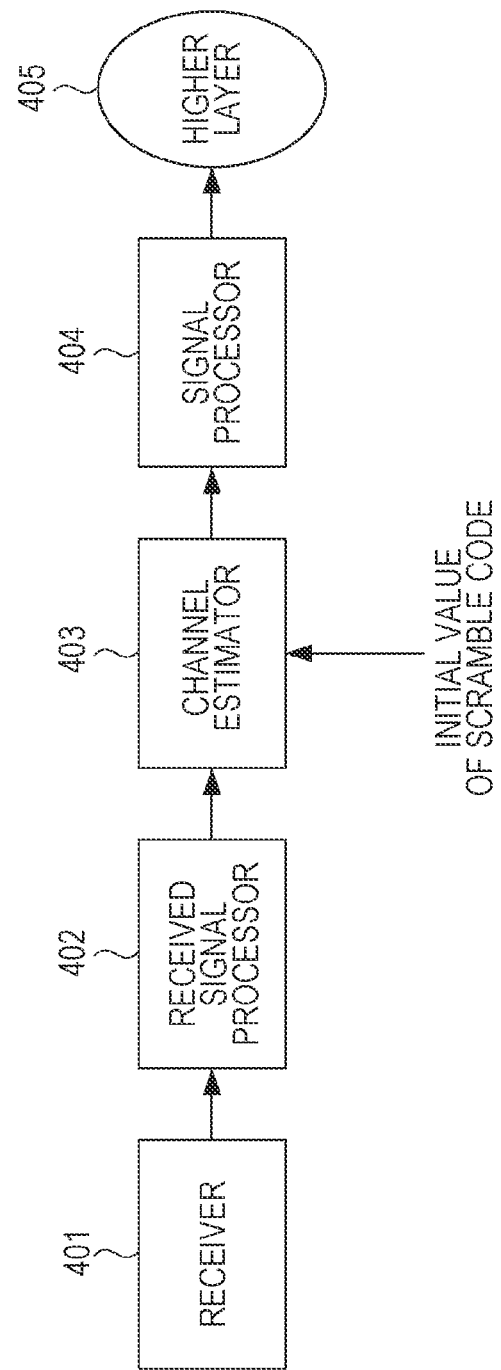
FIG. 4 is a schematic block diagram illustrating a configuration of a terminal according to an embodiment of the present invention.

FIG. 4 is a schematic block diagram illustrating a configuration of a terminal according to an embodiment of the present invention. Herein, the terminal illustrated in FIG. 4 encompasses the terminal 104, the terminal 204, and the terminal 205. As illustrated in FIG. 4, the terminal is equipped with a receiver 401, a received signal processor 402, a channel estimator 403, a data signal processor 404, and a higher layer 405.

The receiver 401, using at least one receive antenna (receive antenna port), receives a signal transmitted by the base station using single-cell communication or multi-cell communication.

The received signal processor 402 removes the added guard interval and conducts a time-to-frequency transform process by applying a fast Fourier transform (FFT) or the like, thereby converting the received signal into a frequency-domain signal. In addition, the received signal processor 402 extracts the signal and the reference signal mapped by the base station. Also, the received signal processor 402 monitors the PDDCH addressed to the terminal itself (also called attempting to decode or blind decoding), and detects downlink control information addressed to the terminal itself.

The channel estimator 403 uses the reference signal to estimate the channel state. At this point, the estimated channel state is used to demodulate the signal transmitted by the base station, for example. Also, the estimated channel state is used to generate feedback information to be transmitted to the base station, for example. Also, the initial value of the scramble sequence used in the base station is input into the channel estimator 403. In other words, a scramble sequence is generated on the basis of the initial value, and a descrambling process is conducted on the reference signal. Also, a 2-chip or 4-chip Walsh sequence, depending on the number of signal layers, is used to despread the reference signal.

At this point, a channel estimation process is conducted by estimating the amplitude and phase variation (frequency response, transfer function) in each resource element, and channel estimation values may be obtained, for example. Note that channel estimation for resource elements into which the reference signal is not mapped is conducted by interpolating in the frequency direction and the time direction on the basis of resource elements into which the reference signal is mapped.

The signal processor 404 conducts a compensation process (filter process) on the channel variation, on the basis of the input signal and the estimated channel estimation values. The channel-compensated signal is subjected to processes such as a layer demapping process, a demodulation process, a descrambling process, and a decoding process on the basis of identified control information, and is output to the higher layer 405. Herein, in the channel compensation process, the estimated channel estimation values are used to conduct channel compensation on the input signal, and detect (reconstruct) the signal in each layer, for example. Also, in the layer demapping process, a process of demapping the signal in each layer into respective codewords is conducted, and thereafter, each codeword is processed. Also, in the demodulation process, demodulation is conducted on the basis of a modulation scheme. Also, in the descramnbling process, a descrambling process is conducted on the basis of a scramble sequence. Furthermore, in the decoding process, an error-correcting decoding process is conducted on the basis of a coding scheme (code rate).

Figure 5:
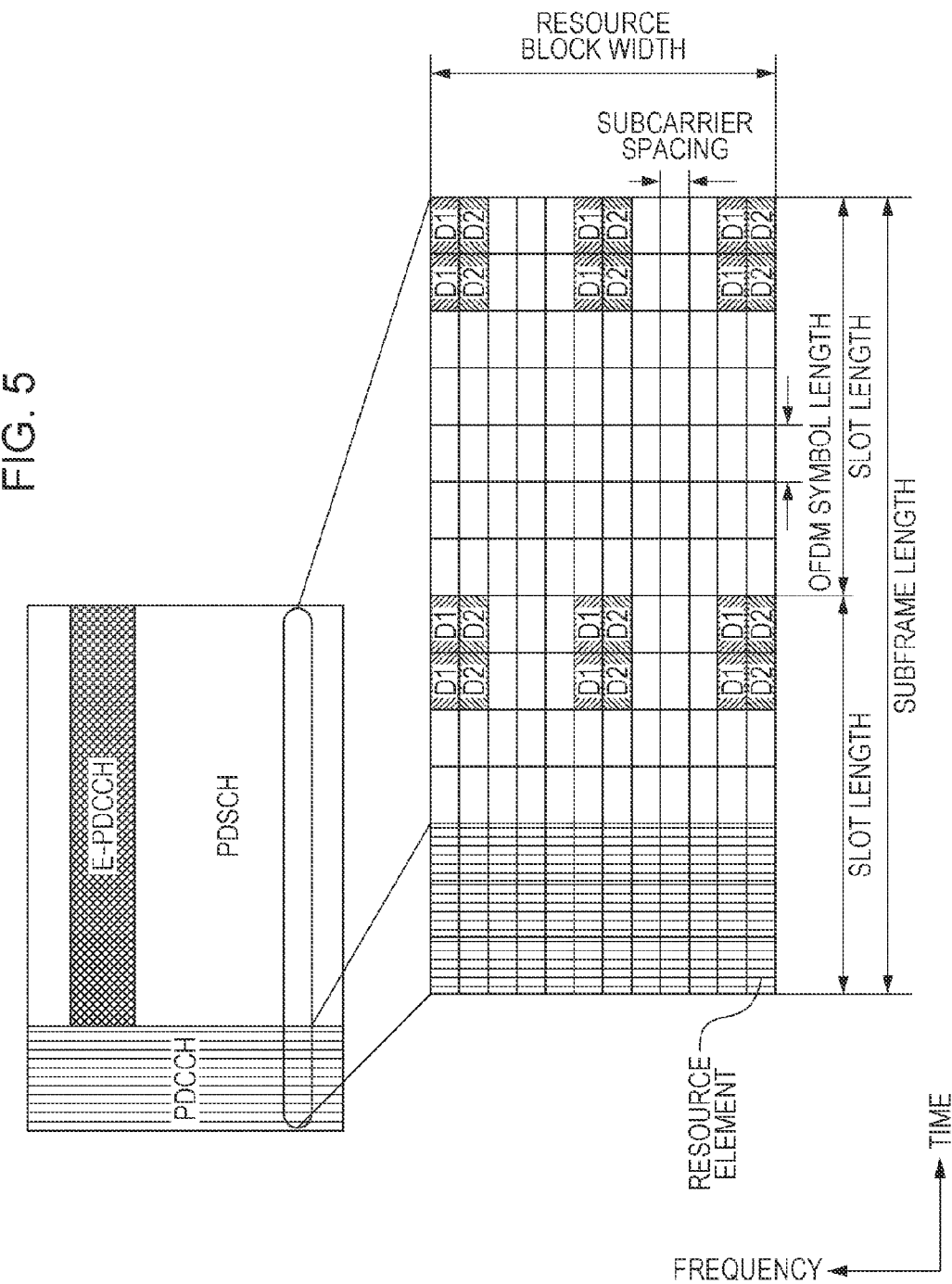
FIG. 5 is a diagram illustrating an example of a signal transmitted by a base station.

FIG. 5 is a diagram illustrating an example of a signal transmitted by a base station. FIG. 5 illustrates one resource block pair, into which are mapped the reference signal, downlink data, and downlink control information. Also, FIG. 5 illustrates two resource blocks within one subframe. For example, one resource block is made up of 12 subcarriers in the frequency domain and 7 OFDM symbols in the time domain.

Herein, each of the 7 OFDM symbols in the time domain within one subframe are also called slots. Also, a resource defined by one OFDM symbol and one subcarrier in one slot is also called a resource element. In addition, two contiguous resource blocks in one subframe are also called a resource block pair.

Herein, in a radio communication system according to the present embodiment, the aggregation of multiple serving cells (also simply called cells) on the uplink and the downlink is supported (called carrier aggregation). For example, in each serving cell, the transmission bandwidth of up to 110 resource blocks may be used. Also, with carrier aggregation, one serving cell is defined to be the primary cell (Pcell). Also, with carrier aggregation, a serving cell other than the primary cell is defined to be a secondary cell (Scell).

Furthermore, a carrier corresponding to a serving cell in the downlink is defined to be a downlink component carrier (DLCC). Also, a carrier corresponding to a primary cell in the downlink is defined to be a downlink primary component carrier (DLPCC). Also, a carrier corresponding to a secondary cell in the downlink is defined to be a downlink secondary component carrier (DLSCC).

Furthermore, a carrier corresponding to a serving cell in the uplink is defined to be an uplink component carrier (ULCC). Also, a carrier corresponding to a primary cell in the uplink is defined to be an uplink primary component carrier (ULPCC). Also, a carrier corresponding to a secondary cell in the uplink is defined to be an uplink secondary component carrier (ULSCC).

In other words, with carrier aggregation, multiple component carriers are aggregated in order to support wide transmission bandwidth. Herein, it is also possible to treat (that is, the base station configures to the terminal) a primary base station as a primary cell and a secondary base station as a secondary cell (also called HetNet deployment with carrier aggregation).

In FIG. 5, the 1st to 3rd OFDM symbols are illustrated as PDCCH resource areas. Also, the 4th and subsequent OFDM symbols on the 10th subcarrier and the 11th subcarrier are illustrated as Enhanced-PDCCH (E-PDCCH) resource areas. In other words, the E-PDCCH is mapped to the 1st slot and the 2nd slot, for example. Also, the PDSCH and the E-PDCCH are not multiplexed within one resource block pair. Also, the PDSCH and the E-PDCCH are multiplexed by frequency-division multiplexing (FDM). In the following, the EPDCCH is included in the PDCCH.

Herein, the PDCCH is used for notifying (specifying) downlink control information (DCI) to the terminal. For example, the downlink control information includes information such as information related to PDSCH resource allocation, information related to a modulation and coding scheme (MCS), information related to a scrambling identity, and information related to a reference signal sequence identity (also called a base sequence identity or base sequence index).

In addition, multiple formats are defined in the downlink control information transmitted on the PDCCH. Herein, a format of downlink control information is also called a DCI format. In other words, fields for each piece of downlink control information are defined in a DCI format.

For example, as DCI formats for the downlink, a DCI format 1 and a DCI format 1A used for the scheduling of one PDSCH in one cell (the transmission of one PDSCH codeword, or one downlink transport block) are defined. In other words, the DCI format 1 and the DCI format 1A are used for transmission on the PDSCH using one transmit antenna port. Additionally, the DCI format 1 and the DCI format 1A are also used for transmission on the PDSCH using multiple transmit antenna ports according to transmission diversity (TxD).

In addition, as DCI formats for the downlink, a DCI format 2, a DCI format 2A, a DCI format 2B, and a DCI format 2C used for the scheduling of one PDSCH in one cell (the transmission of up to two PDSCH codewords, or up to two downlink transport blocks) are defined. In other words, the DCI format 2, the DCI format 2A, the DCI format 2B, and the DCI format 2C are used for transmission on a multiple-input multiple-output spatial domain multiplexing (MIMOSDM) PDSCH using multiple transmit antenna ports.

In FIG. 5, the terminal monitors a set of PDCCH candidates. Herein, a PDCCH candidate refers to a candidate in which the PDCCH may possibly be allocated and transmitted by the base station. Also, a PDCCH candidate is made up of one or multiple control channel elements (CCEs). Also, monitoring means that the terminal attempts to decode on each PDCCH in the set of PDCCH candidates according to all monitored DCI formats. Herein, the set of PDCCH candidates monitored by the terminal is also called a search space. In other words, the search space is the set of resources that possibly may be used by the base station to transmit the PDCCH.

Furthermore, a PDCCH resource area is made up of (defined or configured to have) a common search space (CSS) and a UE-specific search space (USS).

In other words, in FIG. 5, the PDCCH resource area is made up of a CSS and/or a USS. In other words, in FIG. 5, the E-PDCCH resource area is made up of a CSS and/or a USS. The terminal monitors the PDCCH in the CSS and/or USS of the PDCCH resource area, and detects the PDDCH addressed to that terminal itself. Also, the terminal monitors the E-PDCCH in the CSS and/or USS of the E-PDCCH resource area, and detects the PDDCH addressed to that terminal itself.

Herein, the CSS is used to transmit downlink control information to multiple terminals. In other words, the CSS is defined by resources that are shared among multiple terminals. For example, the CSS is made up of CCEs having numbers that are predetermined between the base station and the terminal. For example, the CSS is made up of CCEs with an index from 0 to 15. Herein, the CSS may also be used to transmit downlink control information to a specific terminal. In other words, in the CSS, the base station transmits a DCI format targeting multiple terminals and/or a DCI format targeting a specific terminal.

Meanwhile, the USS is used to transmit downlink control information to a specific terminal. In other words, the USS is defined by resources that are dedicated to one terminal. In other words, the USS is independently defined for each terminal. For example, the USS is made up of CCEs with numbers decided on the basis of a radio network temporary identifier (RNTI) assigned by the base station, slot numbers in a radio frame, or an aggregation level. Herein, the RNTI includes a cell RNTI (C-RNTI) and a semi-persistent C-RNTI (SPS C-RNTI). In other words, in the USS, the base station transmits a DCI format targeting a specific terminal.

For example, with carrier aggregation, each serving cell is made up of a corresponding CSS and/or USS. For example, the CSS corresponding to a primary cell is made up of primary cells. Also, the CSS corresponding to a secondary cell is made up of any one serving cell. Also, the USS corresponding to a primary cell is made up of primary cells. Also, the USS corresponding to a secondary cell is made up of any one serving cell. Herein, the base station is able to configure which serving cells make up the CSS and/or USS corresponding to a secondary cell.

Herein, an RNTI assigned to the terminal by the base station is used to transmit downlink control information (transmission on the PDCCH). Specifically cyclic redundancy check (CRC) parity bits generated on the basis of downlink control information (which may also be a DCI format) are attached to the downlink control information, and after being attached, the CRC parity bits are scrambled by the RNTI.

The terminal attempts to decode the downlink control information with accompanying CRC parity bits scrambled by the RNTI, and detects the PDCCH with a successful CRC as a PDCCH addressed to that terminal itself (also called blind decoding). Herein, the RNTI includes the C-RNTI and the SPS C-RNTI. In other words, the terminal decodes a PDCCH with an accompanying CRC scrambled by the C-RNTI. Also, the terminal decodes a PDCCH with an accompanying CRC scrambled by the SPS C-RNTI.

Herein, the C-RNTI refers to a unique identifier used for identification in radio resource control (RRC) connection and scheduling. For example, the C-RNTI is used for dynamically scheduled unicast transmission. Meanwhile, the SPS C-RNTI refers to a unique identifier used for semi-persistent scheduling (SPS). For example, the SPS C-RNTI is used for semi-persistently scheduled unicast transmission. In other words, the terminal changes the interpretation of the downlink control information on the basis of which RNTI has been used to scramble the CRC.

If a PDSCH resource is scheduled by downlink control information transmitted on the PDCCH, the terminal receives downlink data on the scheduled PDSCH. Herein, the reference signal used for demodulation is mapped to the PDSCH scheduled by the downlink control information.

Also, the base station and the terminal transmit and receive signals in a higher layer. For example, in the RRC layer (Layer 3), the base station and the terminal transmit and receive a radio resource control signal (also called RRC signaling, an RRC message, or RRC information). Herein, in the RRC layer, a dedicated signal transmitted to one terminal by the base station is also called a dedicated signal. In other words, a configuration (information) notified by the base station using the dedicated signal is a configuration that is unique to one terminal.

In addition, the base station and the terminal transmit and receive a media access control (MAC) control element in the MAC layer (Layer 2). Herein, RRC signaling and/or a MAC control element are also called higher layer signaling.

Herein, the reference signal sequence is defined (generated) on the basis of a pseudo-random sequence. For example, the reference signal sequence r(m) is defined by the following formula.

$$r(m) = \frac{1}{\sqrt{2}}(1 - 2 \cdot c(2m)) + j\frac{1}{\sqrt{2}}(1 - 2 \cdot c(2m+1)), \quad \text{[Math. 1]}$$

$$m = \begin{cases} 0, 1, \ldots, 12 N_{RB}^{max,DL} & \text{normal cyclic prefix} \\ 0, 1, \ldots, 16 N_{RB}^{max,DL} - 1 & \text{extended cyclic prefix} \end{cases}$$

Herein, $N_{RB}^{max,DL}$ indicates the maximum downlink bandwidth (which may also be the number of resource blocks). For example, $N_{RB}^{max,DL}$ may be taken to be 110.

The following describes the initialization of the pseudo-random sequence. For example, the pseudo-random sequence c(n) is defined by the following formula.

$$c(n)=(x_1(n+N_c)+x_2(n+N_c))\bmod 2$$

$$x_1(n+31)=(x_1(n+3_c)+x_1(n))\bmod 2$$

$$x_2(n+31)=(x_2(n+3_c)+x_2(n+2)+x_2(n+1)+x_2(n))\bmod 2 \quad \text{[Math. 2]}$$

Herein, $N_c$ is a constant, and may be taken to be 1600, for example.

At this point, an initial value for initializing the pseudo-random sequence is given. For example, the 1st M sequence $x_1(n)$ is initialized according to the following formula.

$$x_1(0)=1, x_1(n)=0, n=1,2,\ldots,30 \quad \text{[Math. 3]}$$

Also, the 2nd M sequence $x_2(n)$ is initialized according to the following formula.

$$c_{init}=\Sigma_{i=0}^{30} x_2(i) \cdot 2^i \quad \text{[Math. 4]}$$

Herein, $c_{init}$ is defined by the following formula.

$$c_{init} = \quad \text{[Math. 5]}$$
$$\begin{cases} (\lfloor n_s/2 \rfloor + 1) \cdot (2N_{ID}^{cell} + 1) \cdot 2^{16} + n_{SCID} & \ldots(1) \text{ if condition } A \\ (\lfloor n_s/2 \rfloor + 1) \cdot (2X + 1) \cdot 2^{16} + Y & \ldots(2) \text{ if condition } B \end{cases}$$

Herein, $n_s$ indicates a slot number within a radio frame. Also, $N_{ID}^{cell}$ indicates a physical layer cell identity. In other words, $N_{ID}^{cell}$ indicates an identity that is specific to the base station (a cell). In other words, $N_{ID}^{cell}$ indicates a physical layer identity of a cell. Also, $n_{SCID}$ indicates a scrambling identity.

For example, the terminal is able to detect $N_{ID}^{cell}$ by using synchronization signals. Also, the terminal is able to acquired $N_{ID}^{cell}$ from information included in the higher layer signal transmitted from the base station (for example, a hand over command). Also, the base station is able to specify $n_{SCID}$ to the terminal by using the information related to the scrambling identity transmitted on the PDCCH (that is, downlink control information).

In other words, $N_{ID}^{cell}$ is a parameter related to generating the reference signal sequence (a parameter related to the reference signal sequence). In addition, $N_{ID}^{cell}$ is a parameter related to initializing the pseudo-random sequence. Also, $n_{SCID}$ is a parameter related to generating the reference signal sequence (a parameter related to the reference signal sequence). In addition, $n_{SCID}$ is a parameter related to initializing the pseudo-random sequence.

Additionally, the parameter "X" (the value of the parameter "X") indicates a virtual cell identity. In other words, the parameter "X" indicates a terminal-specific identity. Also, the parameter "Y" (the value of the parameter "Y") indicates the scrambling identity.

For example, the base station is able to configure to the terminal the parameter "X" by using the higher layer signal. Also, the base station may also configure a plurality of parameters "X" by using the higher layer signal, and indicate one parameter "X" from among the plurality of configured parameters "X" by using the information related to the reference signal sequence identity transmitted on the PDCCH (that is, downlink control information).

Additionally, the base station is able to configure to the terminal the parameter "Y" by using the higher layer signal. Also, the base station may also configure a plurality of parameters "Y" by using the higher layer signal, and indicate one parameter "Y" from among the plurality of configured parameters "Y" by using the information related to the scrambling identity transmitted on the PDCCH (that is, downlink control information).

Furthermore, the base station may also configure a plurality of sets of parameters "X" and parameters "Y" by using the higher layer signal, and indicate one set from among the plurality of configured sets by using downlink control information transmitted on the PDCCH. Herein, the parameter "X" and the parameter "Y" are each configured independently. Also, the parameter "X" and/or the parameter "Y" may also be configured in association with $n_{SCID}$, for example. In addition, $n_{SCID}$ may also be used as the parameter "Y", for example.

In other words, the parameter "X" is a parameter related to generating the reference signal sequence (a parameter related to the reference signal sequence). In addition, the parameter "X" is a parameter related to initializing the pseudo-random sequence. Also, the parameter "Y" is a parameter related to generating the reference signal sequence (a parameter related to the reference signal sequence). In addition, the parameter "Y" is a parameter related to initializing the pseudo-random sequence.

Hereinafter, $N_{ID}^{cell}$ and/or $n_{SCID}$ will also be designated the first parameter. Also, the parameter "X" and/or the parameter "Y" will also be designated the second parameter.

Figure 6:
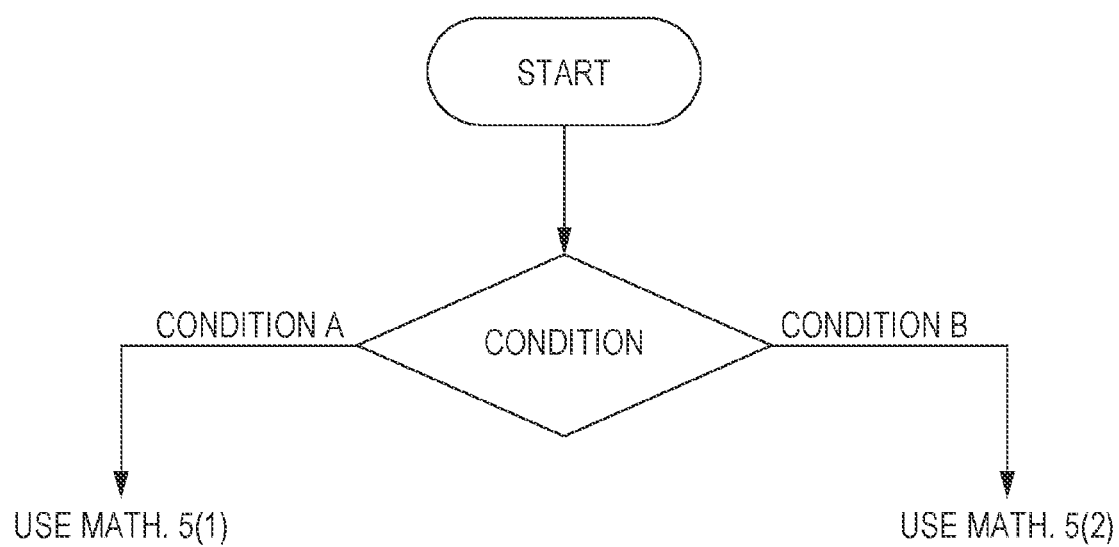
FIG. 6 is a diagram for explaining an embodiment of the present invention.
Figure 7:
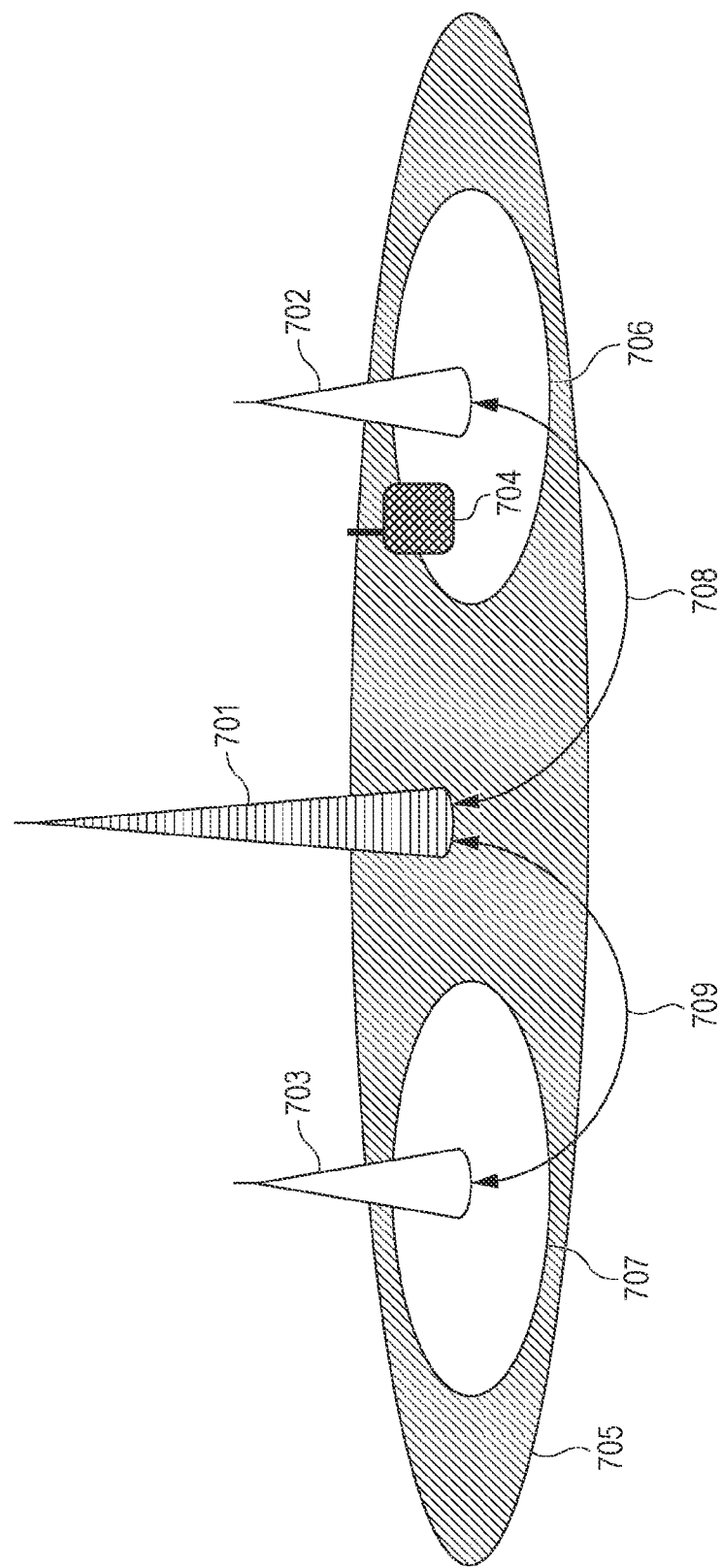
FIG. 7 is a schematic diagram of a radio communication system in a heterogeneous network deployment.

At this point, as illustrated in FIG. 6, the base station identifies a condition, and on the basis of the condition, switches a parameter related to generating the reference signal (or the reference signal sequence). In other words, in the case of a condition A, the base station uses (1) in Math. 5 to generate the reference signal. In other words, in the case of a condition A, the base station uses the first parameter to generate the reference signal. In other words, in the case of a condition A, the base station maps the reference signal (or a part of the reference signal sequence) generated using the first parameter to a resource element within a resource block allocated for PDSCH transmission. In other words, in the case of a condition A, the base station assumes that the terminal demodulates the PDSCH according to the reference signal generated using the first parameter.

Similarly, the terminal identifies a condition, and on the basis of the condition, switches a parameter related to generating the reference signal (or the reference signal sequence). In other words, in the case of a condition A, the terminal assumes that (1) in Math. 5 is used to generate the reference signal. In other words, in the case of a condition A, the terminal assumes that the first parameter is used to generate the reference signal. In other words, in the case of a condition A, the terminal assumes that the reference signal (or a part of the reference signal sequence) generated using the first parameter is mapped to a resource element within a resource block allocated for PDSCH transmission. In other words, in the case of a condition A, the terminal demodulates the PDSCH according to the reference signal generated using the first parameter.

Meanwhile, in the case of a condition B, the base station uses (2) in Math. 5 to generate the reference signal. In other words, in the case of a condition B, the base station uses the second parameter to generate the reference signal. In other words, in the case of a condition B, the base station maps the reference signal (or a part of the reference signal sequence) generated using the second parameter to a resource element within a resource block allocated for PDSCH transmission. In other words, in the case of a condition B, the base station assumes that the terminal demodulates the PDSCH according to the reference signal generated using the second parameter.

Also, in the case of a condition B, the terminal assumes that (2) in Math. 5 is used to generate the reference signal. In other words, in the case of a condition B, the terminal assumes that the second parameter is used to generate the reference signal. In other words, in the case of a condition B, the terminal assumes that the reference signal (or a part of the reference signal sequence) generated using the second parameter is mapped to a resource element within a resource block allocated for PDSCH transmission. In other words, in the case of a condition B, the terminal demodulates the PDSCH according to the reference signal generated using the first parameter.

Herein, the condition A includes that the PDCCH is detected (decoded) in the CSS. In other words, if the PDCCH is allocated in the CSS, the base station uses the first parameter to generate the reference signal. Also, in the case that the PDCCH is detected in the CSS, the terminal demodulates the PDSCH according to the reference signal generated using the first parameter.

In other words, in the case that the PDCCH is detected in the CSS, the terminal demodulates the PDSCH according to the reference signal generated using $N_{ID}^{cell}$. Also, in the case that the PDCCH is detected in the CSS, the terminal demodulates the PDSCH according to the reference signal generated using $n_{SCID}$. Herein, $n_{SCID}$ is indicated by the base station by using the information related to the scrambling identity transmitted on the PDCCH detected in the CSS, for example.

Meanwhile, the condition B includes that the PDCCH is detected (decoded) in the USS. In other words, if the PDCCH is allocated in the USS, the base station uses the second parameter to generate the reference signal. Also, in the case that the PDCCH is detected in the USS, the terminal demodulates the PDSCH according to the reference signal generated using the second parameter.

In other words, in the case that the PDCCH is detected in the USS, the terminal demodulates the PDSCH according to the reference signal generated using the parameter "X". Also, in the case that the PDCCH is detected in the USS, the terminal demodulates the PDSCH according to the reference signal generated using the parameter "Y". At this point, the method of configuring the parameter "X" and/or the parameter "Y" is as discussed earlier. Herein, the information related to the reference signal sequence identity and/or the information related to the scrambling identity is transmitted on the PDCCH in the USS, for example.

In other words, in the case that the PDCCH is detected in the CSS, the terminal receives from the base station the reference signal generated using the first parameter, and in the case that the PDCCH is detected in the USS, the terminal receives from the base station the reference signal generated using the second parameter. In other words, in the case that the PDCCH is detected in the CSS, the terminal receives from the base station the reference signal that is treated as having been generated using the first parameter, and in the case that the PDCCH is detected in the USS, the terminal receives from the base station the reference signal that is treated as having been generated using the second parameter.

In other words, the terminal demodulates the PDSCH by using the reference signal generated using different methods on the basis of the search space in which the PDCCH is detected. In other words, the terminal recognizes that the reference signal is generated using different methods on the basis of whether the PDCCH is detected in the CSS or detected in the USS.

Additionally, the condition A includes that the PDCCH with the CRC scrambled by the C-RNTI is detected (decoded). In other words, if the PDCCH with the CRC scrambled by the C-RNTI is allocated, the base station uses the first parameter to generate the reference signal. Also, in the case that the PDCCH with the CRC scrambled by the C-RNTI is detected, the terminal demodulates the PDSCH according to the reference signal generated using the first parameter.

In other words, in the case that the PDCCH with the CRC scrambled by the C-RNTI is detected, the terminal demodulates the PDSCH according to the reference signal generated using $N_{ID}^{cell}$. Also, in the case that the PDCCH with the CRC scrambled by the C-RNTI is detected, the terminal demodulates the PDSCH according to the reference signal generated using $n_{SCID}$. Herein, $n_{SCID}$ is indicated by the base station by using the information related to the scrambling identity transmitted on the PDCCH with the CRC scrambled by the C-RNTI, for example.

Additionally, the condition B includes that the PDCCH with the CRC scrambled by the SPS C-RNTI is detected (decoded). In other words, if the PDCCH with the CRC scrambled by the SPS C-RNTI is allocated, the base station uses the second parameter to generate the reference signal. Also, in the case that the PDCCH the CRC scrambled by the SPS C-RNTI is detected, the terminal demodulates the PDSCH according to the reference signal generated using the second parameter.

In other words, in the case that the PDCCH with the CRC scrambled by the SPS C-RNTI is detected, the terminal demodulates the PDSCH according to the reference signal generated using the parameter "X". Also, in the case that the PDCCH with the CRC scrambled by the SPS C-RNTI is detected, the terminal demodulates the PDSCH according to the reference signal generated using the parameter "Y". At this point, the method of configuring the parameter "X" and/or the parameter "Y" is as discussed earlier. Herein, the information related to the reference signal sequence identity and/or the information related to the scrambling identity is transmitted on the PDCCH with the CRC scrambled by the SPS C-RNTI, for example.

In other words, in the case that the PDCCH with the CRC scrambled by the C-RNTI is detected, the terminal receives from the base station the reference signal generated using the first parameter, and in the case that the PDCCH with the CRC scrambled by the SPS C-RNTI is detected, the terminal receives from the base station the reference signal generated using the second parameter. In other words, in the case that the PDCCH with the CRC scrambled by the SPS C-RNTI is detected, the terminal receives from the base station the reference signal that is treated as having been generated using the first parameter, and in the case that the PDCCH with the CRC scrambled by the SPS C-RNTI, the terminal receives from the base station the reference signal that is treated as having been generated using the second parameter.

In other words, the terminal demodulates the PDSCH by using the reference signal generated using different methods on the basis of the RNTI used to scramble the CRC. In other words, the terminal recognizes that the reference signal is generated using different methods on the basis of whether the CRC is scrambled by the C-RNTI or scrambled by the SPS C-RNTI.

Additionally, the condition A may also include that the PDCCH with the CRC scrambled by the C-RNTI is detected (decoded) in the CSS. In other words, if the PDDCH with the CRC scrambled by the C-RNTI is allocated in the CSS, the base station uses the first parameter to generate the reference signal. Also, in the case that the PDCCH with the CRC scrambled by the C-RNTI is detected in the CSS, the terminal demodulates the PDSCH according to the reference signal generated using the first parameter.

In other words, in the case that the PDCCH with the CRC scrambled by the C-RNTI is detected in the CSS, the terminal demodulates the PDSCH according to the reference signal generated using $N_{ID}^{cell}$. Also, in the case that the PDCCH with the CRC scrambled by the C-RNTI is detected in the CSS, the terminal demodulates the PDSCH according to the reference signal generated using $n_{SCID}$. Herein, $n_{SCID}$ is indicated by the base station by using the information related to the scrambling identity transmitted on the PDCCH with the CRC scrambled by the C-RNTI in the CSS, for example.

Additionally, the condition B may also include that the PDCCH with the CRC scrambled by the C-RNTI is detected (decoded) in the USS, or the SPS C-RNTI is detected (decoded) in either search space (the CSS or the USS). Hereinafter, these conditions will be designated the condition C for the sake of simplicity. In other words, in the case of the condition C, the base station uses the second parameter to generate the reference signal. Also, in the case of the condition C, the terminal demodulates the PDSCH according to the reference signal generated using the second parameter.

In other words, in the case of the condition C, the terminal demodulates the PDSCH according to the reference signal generated using the parameter "X". In other words, in the case of the condition C, the terminal demodulates the PDSCH according to the reference signal generated using the parameter "Y". At this point, the method of configuring the parameter "X" and/or the parameter "Y" is as discussed earlier. Herein, the information related to the reference signal sequence identity and/or the information related to the scrambling identity is transmitted on the PDCCH under the condition C, for example.

In other words, in the case that the PDCCH with the CRC scrambled by the C-RNTI is detected in the CSS, the terminal receives from the base station the reference signal generated using the first parameter. Also, in the case that the PDCCH with the CRC scrambled by the C-RNTI is detected in the USS, or the SPS C-RNTI is detected in either search space (the CSS or the USS), the terminal receives from the base station the reference signal generated using the second parameter. In other words, in the case that the PDCCH with the CRC scrambled by the C-RNTI is detected in the CSS, the terminal receives from the base station the reference signal that is treated as having been generated using the first parameter. Also, in the case that the PDCCH with the CRC scrambled by the C-RNTI is detected in the USS, or the SPS C-RNTI is detected in either search space (the CSS or the USS), the terminal receives from the base station the reference signal that is treated as having been generated using the second parameter.

In other words, the terminal demodulates the PDSCH by using the reference signal generated using different methods on the basis of the search space in which the PDCCH is detected, and the RNTI used to scramble the CRC. In other words, the terminal recognizes that the reference signal is generated using different methods on the basis of the search space in which the PDCCH is detected, and the RNTI used to scramble the CRC.

In addition, the condition A includes that a predetermined DCI format (hereinafter designated a first DCI format) is received (detected, decoded). Herein, the first DCI format is defined in advance according to specifications or the like. In other words, by defining the first DCI format in advance according to specifications or the like, the first DCI format may be treated as known information between the base station and the terminal. In other words, in the case that the first DCI format is transmitted, the base station uses the first parameter to generate the reference signal. Also, in the case that the first DCI format is received, the terminal demodulates the PDSCH according to the reference signal generated using the first parameter.

In other words, in the case that the first DCI format is received, the terminal demodulates the PDSCH according to the reference signal generated using $N_{ID}^{cell}$. Also, in the case that the first DCI format is received, the terminal demodulates the PDSCH according to the reference signal generated using $n_{SCID}$. Herein, $n_{SCID}$ is indicated by the base station by using the information related to the scrambling identity included in the first DCI format, for example.

In addition, the condition B includes that a DCI format other than the predetermined DCI format (hereinafter designated a second DCI format) is received (detected). In other words, in the case that the second DCI format is transmitted, the base station uses the second parameter to generate the reference signal. Also, in the case that the second DCI format is received, the terminal demodulates the PDSCH according to the reference signal generated using the second parameter.

In other words, in the case that the second DCI format is received, the terminal demodulates the PDSCH according to the reference signal generated using the parameter "X". Also, in the case that the second DCI format is received, the terminal demodulates the PDSCH according to the reference signal generated using the parameter "Y". At this point, the method of configuring the parameter "X" and/or the parameter "Y" is as discussed earlier. Herein, the information related to the reference signal sequence identity and/or the information related to the scrambling identity is transmitted by being included in the second DCI format.

In other words, in the case that the first DCI format is detected, the terminal receives from the base station the reference signal generated using the first parameter, and in the case that the second DCI format is detected, the terminal receives from the base station the reference signal generated using the second parameter. In other words, in the case that the first DCI format is detected, the terminal receives from the base station the reference signal that is treated as having been generated using the first parameter, and in the case that the second DCI format, the terminal receives from the base station the reference signal that is treated as having been generated using the second parameter.

In other words, the terminal demodulates the PDSCH by using the reference signal generated using different methods on the basis of the received DCI format. In other words, the terminal recognizes that the reference signal is generated using different methods on the basis of whether the predetermined DCI format is received, or the DCI format other than the predetermined DCI format is received.

In other words, the terminal may also demodulate the PDSCH by using the reference signal generated using different methods on the basis of the DCI format, the search space in which the PDCCH is detected, and the RNTI used to scramble the CRC. In other words, the terminal may also recognize that the reference signal is generated using different methods on the basis of the DCI format, the search space in which the PDCCH is detected, and the RNTI used to scramble the CRC.

Herein, the base station may also generate the reference signal by using a default value as the parameter in (2) in Math. 5. In other words, the base station uses a default value of the parameter "X" to generate the reference signal. Also, the base station uses a default value of the parameter "Y" to generate the reference signal. In other words, the base station maps the reference signal (or a part of the reference signal sequence) generated using the default value to a resource element within a resource block allocated for PDSCH transmission. In other words, the base station assumes that the terminal demodulates the PDSCH according to the reference signal generated using the default value.

Additionally, the terminal may also assume that the reference signal is generated by using the default value as the parameter in (2) in Math. 5. In other words, the terminal assumes that the default value of the parameter "X" is used to generate the reference signal. Also, the terminal assumes that the default value of the parameter "Y" is used to generate the reference signal. In other words, the terminal assumes that the reference signal (or a part of the reference signal sequence) generated using the default value is mapped to a resource element within a resource block allocated for PDSCH transmission. In other words, the terminal demodulates the PDSCH according to the reference signal generated using the default value.

Herein, the default value is defined in advance according to specifications or the like. In other words, the default value may be defined in advance according to specifications or the like, and be treated as known information between the base station and the terminal. For example, the default value of the parameter "X" may be $N_{ID}^{cell}$. Also, the default value of the parameter "Y" may be "0".

According to a method as discussed above, it is possible to more flexibly switch the reference signal sequence, and transmit and receive the reference signal, for example. Also, according to a method as discussed above, it is possible to more dynamically switch the reference signal sequence, and transmit and receive the reference signal.

For example, during a period in which the base station and the terminal are conducting configuration in the RRC layer, the condition A may be used to transmit and receive the reference signal. In other words, during a period of ambiguous (indefinite) configuration that occurs while conducting configuration in the RRC layer (a period during which mismatched configurations occur between the base station and the terminal), the condition A may be used to transmit and receive the reference signal. In other words, it becomes possible for the base station and the terminal to continue communicating even during a period of conducting configuration in the RRC layer, and communication that efficiently uses radio resources may be conducted.

A program operating on the primary base station, the secondary base station, and the terminal according to the present invention is a program that controls a CPU or the like (a program that causes a computer to function) so as to realize the functions of the foregoing embodiment according to the present invention. Additionally, information handled by these devices is temporarily buffered in RAM during the processing thereof, and thereafter stored in various types of ROM or an HDD, read out, and modified/written by the CPU as necessary. A recording medium that stores the program may be any of a semiconductor medium (such as ROM or a non-volatile memory card, for example), an optical recording medium (such as a DVD, MO, MD, CD, or BD, for example), or a magnetic recording medium (such as magnetic tape or a flexible disk, for example). Also, rather than the functions of the embodiment discussed above being realized by executing a loaded program, in some cases the functions of the present invention may be realized by joint processing with an operating system, another application program, or the like.

Also, in the case of distribution into the market, the program may be distributed such as by being stored on a portable recording medium, or by being transferred to a server computer connected via a network such as the Internet. In this case, a storage device of the server computer is also included in the present invention. In addition, all or part of a primary base station, secondary base station, and terminal in an embodiment like the foregoing may also be realized by LSI, which is typically an integrated circuit. In this case, the respective function blocks of the primary base station, secondary base station, and terminal may be realized as individual chips, or all or part thereof may be integrated as a single chip. Furthermore, the circuit integration methodology is not limited to embedded applications and may be also be realized with special-purpose circuits, general-purpose processors, or the like. In addition, if progress in semiconductor technology yields integrated circuit technology that may substitute for LSI, the use of an integrated circuit according to that technology is also possible.

The foregoing thus describes an embodiment of the present invention in detail and with reference to the drawings. However, specific configurations are not limited to this embodiment, and design modifications or the like within a scope that does not depart from the spirit of the present invention are to be included. Furthermore, various modifications of the present invention are possible within the scope indicated by the claims. Embodiments obtained by appropriately combining the technical means respectively disclosed in different embodiments are also included within the technical scope of the present invention. Additionally, configurations in which elements described in the foregoing embodiments and exhibiting similar advantageous effects are substituted with each other are also to be included.

INDUSTRIAL APPLICABILITY

The present invention is suitable for a mobile station device, a base station device, a communication method, a radio communication system, and an integrated circuit.

DESCRIPTION OF REFERENCE NUMERALS 101 primary base station
102 secondary base station
103 link
104, 204, 205 terminal
105, 106, 206, 207 downlink
301, 405 higher layer
302 signal generator
303 reference signal multiplexer
304 transmitted signal generator
305 transmitter
401 receiver
402 received signal processor
403 channel estimator
404 signal processor
701 macro base station
702, 703 RRH
704 terminal
705, 706, 707 coverage
708, 709 link

The invention claimed is:

1. A user equipment comprising:
a receiving unit configured to receive, from a base station device, a higher layer signal including information for configuring a first value and a second value, the receiving unit being further configured to receive, from the base station device, a reference signal on resource blocks on which a physical downlink shared channel is mapped, a reference signal sequence of the reference signal being defined by using a pseudo-random sequence which is initialized with $C_{init}$ expressed as $$c_{init}=(\lfloor n_s/2 \rfloor+1)\cdot(2X+1)\cdot 2^{16}+n_{SCID},$$

where $n_s$ is a slot number within a radio frame and the mathematical symbols $\lfloor\ \rfloor$ denote a floor function, wherein,
in a case that a first downlink control information format with cyclic redundancy check (CRC) scrambled by cell-radio network temporary identifier (C-RNTI) is detected, in a common search space, for scheduling of a transmission of the physical downlink shared channel, a value of the parameter X is given by a physical layer cell identity, and a value of the scrambling identity $n_{scid}$ is zero, and
in a case that a second downlink control information format with cyclic redundancy check (CRC) scrambled by cell radio network temporary identifier (C-RNTI) is detected, in a user specific search space, for scheduling of a transmission of the physical downlink shared channel, either one of the first value and the second value is used for the parameter X, whether to use the first value or the second value for the parameter X is determined by a value of the scrambling identity $n_{scid}$, and the value of the scrambling identity $n_{scid}$ is indicated by the second downlink control information format.

2. The user equipment according to claim 1, wherein a value of the parameter X is given by the physical layer cell identity in a case that no values are configured for the first value and the second value.

3. The user equipment according to claim 1, wherein the reference signal is a user equipment-specific reference signal.

4. A base station device comprising:
a transmitting unit configured to transmit, to a user equipment, a higher layer signal including information for configuring a first value and a second value, the transmitting unit being configured to transmit, to the user equipment, a reference signal on resource blocks on which a physical downlink shared channel is mapped, a reference signal sequence of the reference signal being defined by using a pseudo-random sequence which is initialized with $c_{init}$ expressed as $$c_{init}=(\lfloor n_s/2 \rfloor+1)\cdot(2X+1)\cdot 2^{16}+n_{SCID},$$

where $n_s$ is a slot number within a radio frame and the mathematical symbols $\lfloor\ \rfloor$ denote a floor function, wherein,
in a case that a first downlink control information format with cyclic redundancy check (CRC) scrambled by cell-radio network temporary identifier (C-RNTI) is transmitted, in a common search space, for scheduling of a transmission of the physical downlink shared channel, a value of the parameter X is given by a physical layer cell identity, and a value of the scrambling identity $n_{SCID}$ is zero, and
in a case that a second downlink control information format with cyclic redundancy check (CRC) scrambled by cell radio network temporary identifier (C-RNTI) is transmitted, in a user specific search space, for scheduling of a transmission of the physical downlink shared channel, either one of the first value and the second value is used for the parameter X, whether to use the first value or the second value for the parameter X is determined by a value of the scrambling identity $n_{SCID}$, and the value of the scrambling identity $n_{SCID}$ is indicated by the second downlink control information format.

5. The base station device according to claim 4, wherein a value of the parameter X is given by the physical layer cell identity in a case that no values are configured for the first value and the second value.

6. The base station device according to claim 4, wherein the reference signal is a user equipment-specific reference signal.

7. A communication method of a user equipment, the communication method comprising:
receiving, from a base station device, a higher layer signal including information for configuring a first value and a second value; and
receiving, from the base station device, a reference signal on resource blocks on which a physical downlink shared channel is mapped, a reference signal sequence of the reference signal being defined by using a pseudo-random sequence which is initialized with $c_{init}$ expressed as $$c_{init}=(\lfloor n_s/2 \rfloor+1)\cdot(2X+1)\cdot 2^{16}+n_{SCID},$$

where $n_s$ is a slot number within a radio frame and the mathematical symbols $\lfloor\ \rfloor$ denote a floor function, wherein,
in a case that a first downlink control information format with cyclic redundancy check (CRC)

scrambled by cell-radio network temporary identifier (C-RNTI) is detected, in a common search space, for scheduling of a transmission of the physical downlink shared channel, a value of the parameter X is given by a physical layer cell identity, and a value of the scrambling identity $n_{SCID}$ is zero, and in a case that a second downlink control information format with cyclic redundancy check (CRC) scrambled by cell radio network temporary identifier (C-RNTI) is detected, in a user specific search space, for scheduling of a transmission of the physical downlink shared channel, either one of the first value and the second value is used for the parameter X, whether to use the first value or the second value for the parameter X is determined by a value of the scrambling identity $n_{SCID}$, and the value of the scrambling identity $n_{SCID}$ is indicated by the second downlink control information format.

8. The communication method according to claim 7, wherein a value of the parameter X is given by the physical layer cell identity in a case that no values are configured for the first value and the second value.

9. The communication method according to claim 7, wherein the reference signal is a user equipment-specific reference signal.

10. A communication method of a base station device, the communication method comprising:

transmitting, to a user equipment, a higher layer signal including information for configuring a first value and a second value; and transmitting, to the user equipment, a reference signal on resource blocks on which a physical downlink shared channel is mapped, a reference signal sequence of the reference signal being defined by using a pseudo-random sequence which is initialized with $c_{init}$ expressed as $$c_{init}=(\lfloor n_s/2 \rfloor+1)\cdot(2X+1)\cdot 2^{16}+n_{SCID},$$

where $n_s$ is a slot number within a radio frame and the mathematical symbols $\lfloor \; \rfloor$ denote a floor function, wherein, in a case that a first downlink control information format with cyclic redundancy check (CRC) scrambled by cell-radio network temporary identifier (C-RNTI) is transmitted, in a common search space, for scheduling of a transmission of the physical downlink shared channel, a value of the parameter X is given by a physical layer cell identity, and a value of the scrambling identity $n_{SCID}$ is zero, and in a case that a second downlink control information format with cyclic redundancy check (CRC) scrambled by cell radio network temporary identifier (C-RNTI) is transmitted, in a user specific search space, for scheduling of a transmission of the physical downlink shared channel, either one of the first value and the second value is used for the parameter X, whether to use the first value or the second value for the parameter X is determined by a value of the scrambling identity $n_{SCID}$, and the value of the scrambling identity $n_{SCID}$ is indicated by the second downlink control information format.

11. The communication method according to claim 10, wherein a value of the parameter X is given by the physical layer cell identity in a case that no values are configured for the first value and the second value.

12. The communication method according to claim 10, wherein the reference signal is a user equipment-specific reference signal.

13. An integrated circuit mounted in a user equipment, the integrated circuit causing the user equipment to execute:

a function that receives, from a base station device, a higher layer signal including information for configuring a first value and a second value; and a function that receives, from the base station device, a reference signal on resource blocks on which a physical downlink shared channel is mapped, a reference signal sequence of the reference signal being defined by using a pseudo-random sequence which is initialized with $c_{init}$ expressed as $$c_{init}=(\lfloor n_s/2 \rfloor+1)\cdot(2X+1)\cdot 2^{16}+n_{SCID},$$

where $n_s$ is a slot number within a radio frame and the mathematical symbols $\lfloor \; \rfloor$ denote a floor function, wherein, in a case that a first downlink control information format with cyclic redundancy check (CRC) scrambled by cell-radio network temporary identifier (C-RNTI) is detected, in a common search space, for scheduling of a transmission of the physical downlink shared channel, a value of the parameter X is given by a physical layer cell identity, and a value of the scrambling identity $n_{SCID}$ is zero, and in a case that a second downlink control information format with cyclic redundancy check (CRC) scrambled by cell radio network temporary identifier (C-RNTI) is detected, in a user specific search space, for scheduling of a transmission of the physical downlink shared channel, either one of the first value and the second value is used for parameter X, whether to use the first value or the second value for the parameter X is determined by a value of the scrambling identity $n_{SCID}$, and the value of the scrambling identity $n_{SCID}$ is indicated by the second downlink control information format $n_{SCID}$.

14. The integrated circuit according to claim 13, wherein a value of the parameter X is given by the physical layer cell identity in a case that no values are configured for the first value and the second value.

15. The integrated circuit according to claim 13, wherein the reference signal is a user equipment-specific reference signal.

16. An integrated circuit mounted in a base station device, the integrated circuit causing the base station device to execute:

a function that transmits, to a user equipment, a higher layer signal including information for configuring a first value and a second value; and a function that transmits, to the user equipment, a reference signal on resource blocks on which a physical downlink shared channel is mapped, a reference signal sequence of the reference signal being defined by using a pseudo-random sequence which is initialized with $c_{init}$ expressed as $$c_{init}=(\lfloor n_s/2 \rfloor+1)\cdot(2X+1)\cdot 2^{16}+n_{SCID},$$

where $n_s$ is a slot number within a radio frame and the mathematical symbols $\lfloor \; \rfloor$ denote a floor function, wherein, in a case that a first downlink control information format with cyclic redundancy check (CRC) scrambled by cell-radio network temporary identifier (C-RNTI) is transmitted, in a common search space, for scheduling of a transmission of the physical downlink shared channel, a value of the parameter X is given by a physical layer cell identity, and a value of the scrambling identity $n_{SCID}$ is zero, and in a case that a second downlink control information format with cyclic redundancy check (CRC) scrambled by cell radio network temporary identifier (C-RNTI) is transmitted, in a user specific search space, for scheduling of a transmission of the physical downlink shared channel, is either one of the first value and the second value is used for the parameter X, whether to use the first or the second value of r the parameter X is determined by a value of the scrambling identity $n_{SCID}$, and the value of the scrambling identity $n_{SCID}$ is indicated by the second downlink control information format.

17. The integrated circuit according to claim 16, wherein a value of the parameter X is given by the physical layer cell identity in a case that no values are configured for the first value and the second value.

18. The integrated circuit according to claim 16, wherein the reference signal is a user equipment-specific reference signal.

* * * * *